(12) United States Patent
Grosskopf et al.

(10) Patent No.: US 7,868,494 B2
(45) Date of Patent: Jan. 11, 2011

(54) RECTIFIER ASSEMBLY

(75) Inventors: Andrew P. Grosskopf, Rockford, IL (US); Glenn C. Lemmers, Jr., Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 270 days.

(21) Appl. No.: 12/198,597

(22) Filed: Aug. 26, 2008

(65) Prior Publication Data
US 2010/0054005 A1 Mar. 4, 2010

(51) Int. Cl.
*H02K 11/04* (2006.01)
(52) U.S. Cl. .................... 310/68 D; 363/141
(58) Field of Classification Search ............ 310/68 D; 363/141, 145
See application file for complete search history.

(56) References Cited

U.S. PATENT DOCUMENTS

| | | | |
|---|---|---|---|
| 3,705,331 A * | 12/1972 | South et al. | 361/20 |
| 3,821,633 A * | 6/1974 | Neasham et al. | 322/73 |
| 4,456,843 A * | 6/1984 | Heyne et al. | 310/68 D |
| 4,581,695 A | 4/1986 | Hoppe | |
| 5,124,603 A * | 6/1992 | Hayward et al. | 310/68 D |
| 5,138,210 A * | 8/1992 | Crickmore et al. | 310/68 D |
| 6,163,138 A * | 12/2000 | Kohl et al. | 322/28 |
| 6,661,135 B2 | 12/2003 | Borden et al. | |
| 7,166,943 B2 | 1/2007 | Johnsen | |
| 2006/0284499 A1 | 12/2006 | Rubbo et al. | |
| 2007/0108854 A1 | 5/2007 | Osborn et al. | |

FOREIGN PATENT DOCUMENTS

EP 1788693 A1 5/2007
JP 54050908 A * 4/1979

\* cited by examiner

*Primary Examiner*—Burton Mullins
(74) *Attorney, Agent, or Firm*—Kinney & Lange, P.A.

(57) ABSTRACT

A rotating rectifier includes diode subassemblies that each have an AC contact between two diodes, held in place by a spring clip or interference fit between an inner DC bus and an outer DC bus. The outer DC bus can also act as a housing and heat sink. Diodes and resistors are distributed around the rotating rectifier. Zener diodes can be included in series with the resistors to provide further protection to the diodes to ensure proper operation of the rectifier.

19 Claims, 5 Drawing Sheets

RECTIFIER ASSEMBLY

BACKGROUND

The present invention relates to rotating rectifiers. A rotating rectifier assembly is an electronic device that converts alternating current produced by rotating elements of electrical machinery into direct current. A common application for the rotating rectifier assembly is within a brushless generator.

A typical brushless generator includes an exciter and a main generator for converting the rotational energy generated by a prime mover into multiphase alternating current (AC). The exciter may include stationary field windings which develop a magnetic field when electrically coupled to receive a direct current (DC) voltage from a DC voltage source, such as a voltage regulator, voltage control device, or battery. The exciter may also include windings mounted on the generator rotor, which rotate within this magnetic field. During rotation, alternating current is induced in the exciter rotor windings. Typically, the exciter rotor windings are wound such that the induced alternating current is a three-phase alternating current. Rectifier circuits then convert three-phase AC from the exciter rotor windings into a DC output to supply to the main generator.

These rectifier circuits are electrically coupled between two sets of windings, both mounted on the generator rotor, resulting in the rectifier also being mounted on the generator rotor. For this reason, this type of rectifier circuit is often referred to as a rotating rectifier.

The semiconductor devices used in rectifiers dissipate power in the form of heat during operation. Without proper attention to cooling, the semiconductor devices may fail. Many traditional rotating rectifiers lack adequate mounting surface and heat sink area to be utilized in high temperature applications. Additionally, conventional solder mount components experience higher failure rates due to the generated heat and the centrifugal forces encountered during operation.

SUMMARY

In one aspect of the invention, a rotating rectifier includes a first DC contact connected to a circular inner DC bus and a second DC contact connected to a circular outer DC bus. A plurality of diode subassemblies is oriented radially between the inner and outer DC bus. Each diode subassembly includes an AC contact located between a first and second diode where the first diode is in contact with the inner DC bus and the second diode is in contact with the outer DC bus.

In another aspect of the invention, a rotating rectifier includes a first DC contact connected to a first DC bus and a second DC contact connected to an outer DC bus. A first plurality of diodes is in contact with the first DC bus and a second plurality of diodes is in contact with the second DC bus. A plurality of AC contacts is connected with the first and second plurality of diodes to form a full wave rectifier. A plurality of resistors is connected between the first and second DC bus.

DETAILED DESCRIPTION

Figure 1A:
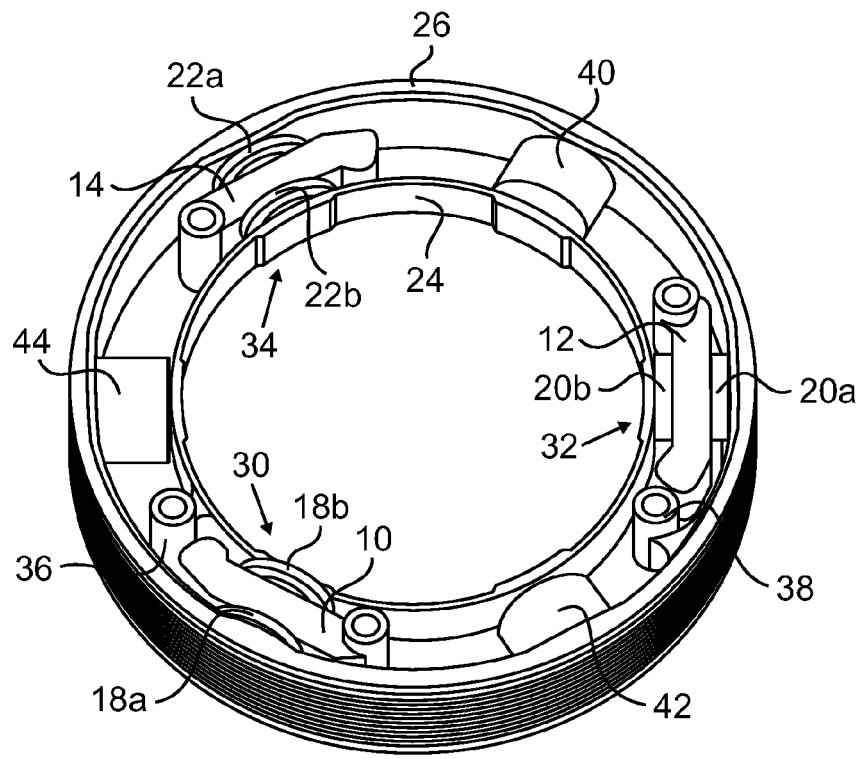
FIG. 1a is a perspective view of a three phase rotating rectifier according to an embodiment of the present invention with the outer housing and internal housing removed.

FIG. 1a is a perspective view of a three phase rotating rectifier according to an embodiment of the present invention. AC contacts 10, 12, and 14 are held between diodes 18a, 18b, 20a, 20b, 22a, and 22b by DC+ bus bar 24 and DC− bus bar 26. Each AC contact and pair of diodes forms a diode subassembly that is oriented radially outward from the center of the rotating rectifier. AC contact 10 and diodes 18a and 18b form diode subassembly 30; AC contact 12 and diodes 20a and 20b form diode subassembly 32; and AC contact 14 and diodes 22a and 22b form diode subassembly 34. Each diode has two terminals, an anode and a cathode. For proper operation as a full wave rectifier, the cathodes of diodes 18a, 20a, and 22a are connected to DC− bus bar 26. The anodes of diodes 18a, 20a, and 22a and cathodes of diodes 18b, 20b, and 22b are connected to AC contacts 10, 12, and 14 respectively. The anode of diodes 18b, 20b, and 20c are connected to DC+ bus bar 24. Contact to DC+ bus bar 24 is provided by DC+ contact 36 and contact to DC− bus bar 26 is provided by DC− contact 38.

In general, there is one diode subassembly for each phase of a multi phase machine. For a three phase unit such as is shown in FIG. 1a, there are three diode subassemblies. Each diode subassembly is held radially between the outer bus bar and the inner bus bar. In the embodiment shown, the outer bus bar is DC− bus bar 26 and the inner bus bar is DC+ bus bar 24. Packaging the AC contacts and diodes into a diode subassembly offers a packaging advantage that makes assembly of the rectifier easier.

The outer diameter of DC+ bus bar 24 is slightly larger than the space available (the inner diameter of DC− bus bar 26 less the thickness of the diode subassemblies) to create a tension, or interference, fit to hold the diode subassemblies in place. This assembly technique eliminates the need for soldering.

To further manage heat, DC− bus bar 26 also serves as a heat sink. It is constructed of a thermally conductive material such as copper or beryllium copper. When a weaker material such as copper is used, a reinforcing support band, for example high strength steel, can be used to increase the rigidity of the element. Beryllium copper is a stronger material than copper reducing the need for a support band.

The rotating rectifier is also oil cooled to increase heat management efficiency. During oil starved conditions, such as starting or during oil interruptions, the large heat sink formed by the outer bus bar (here DC− bus bar 26) provides sufficient cooling until the oil flow is re-established.

Some embodiments also include one or more resistors such as resistors 40, 42, and 44. Previous designs that included a resistor would contain only one resistor, creating a hot spot in the rectifier due to the heat dissipated by the resistor. During conditions where cooling oil flow is restricted, such as starting, these hot spots could lead to early device failure by subjecting the device to excessive heat. Replacing the single resistor with multiple resistors provides a more uniform heating distribution which reduces hot spots. In the case of a three phase device, three resistors balance the heat distribution effect so that creation of hot spots is avoided.

Figure 1B:
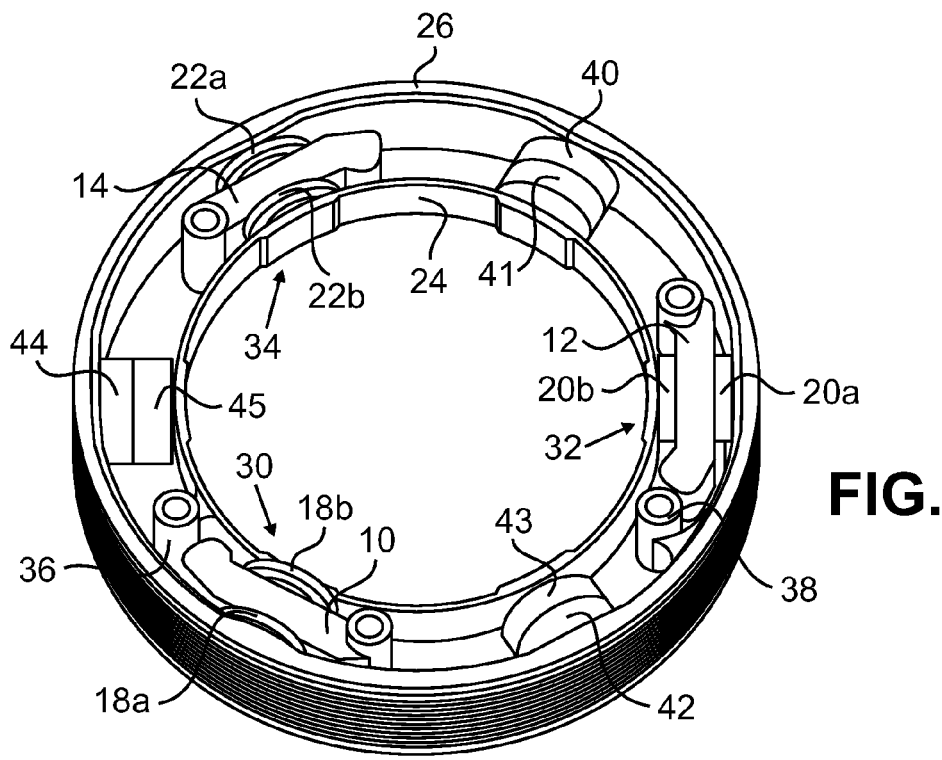
FIG. 1b is a perspective view of the three phase rotating rectifier of FIG. 1a including zener diodes in series with the resistors.

In other embodiments, the effectiveness of the resistors in protecting the device can be increased by including a series zener diode. FIG. 1b is a perspective view of a rotating rectifier including zener diodes 41, 43, and 45 in series with resistors 40, 42, and 44 respectively. Zener diodes 41, 43, and 45 are held in place with the resistor using the same interference mounting technique as is used for diode subassemblies 30, 32, and 34. The advantage of using zener diodes 41, 43, and 45 is that it limits the reverse voltage that can occur during failure modes of the generator main field and reduces rectifier assembly losses. For example, zener diodes 41, 43, and 45 reduce the effect of load transients and rapid voltage swings by acting as a shunt. This, in turn, reduces diode temperature and increases diode life.

The radial orientation of the resistors and diode subassemblies also increase the interference fit holding force as the rectifier increases in speed. As the rotational speed of the rectifier increases, the force generated radially outward increases. In traditional designs with parts mounted perpendicular to the radial direction, this created increased shear stresses on the parts. In designs according to the present invention, this radial force holds the parts more securely.

Figure 2:
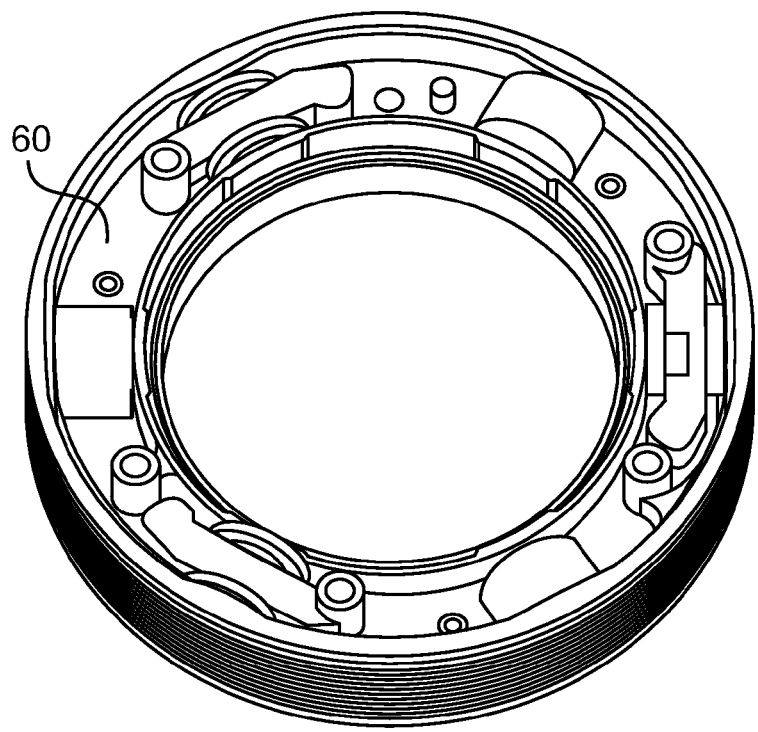
FIG. 2 is a perspective view of the three phase rectifier of FIGS. 1a and 1b with the internal housing installed.
Figure 3:
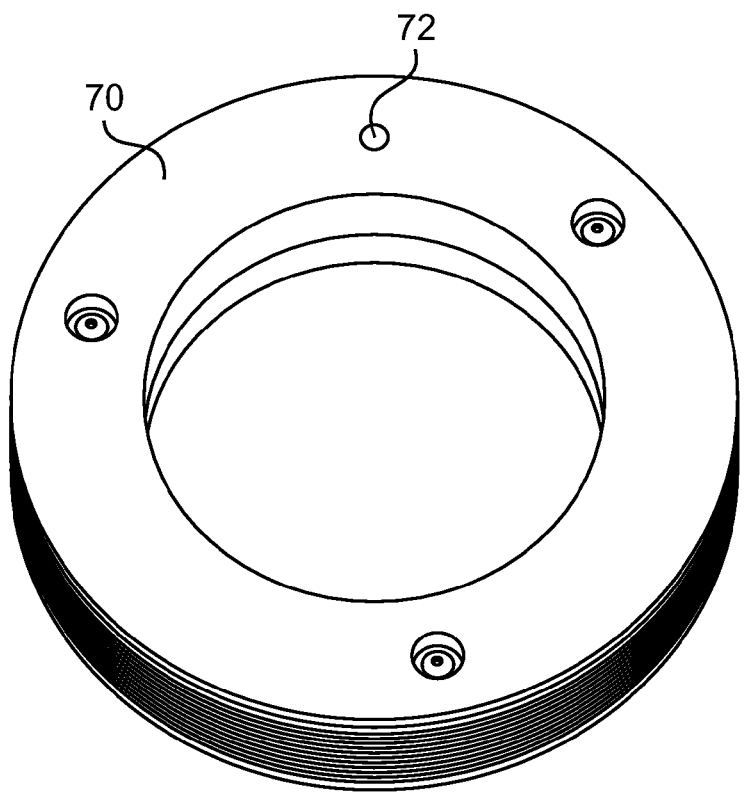
FIG. 3 is a perspective view of the three phase rectifier of FIGS. 1a, 1b, and 2 with the outer housing installed.

FIG. 2 is a perspective view of the rotating rectifier of FIGS. 1a and 1b with internal housing 60 included. Internal housing 60 is made of a non-conducting material such as polyamide-imide (PAI). For example, one suitable PAI material is sold under the trademark TORLON® and manufactured by Solvay Advanced Polymers, LLC of Alpharetta, Ga. Internal housing 60 is used to position the components and add strength to the assembly. FIG. 3 is a perspective view of the rotating rectifier of FIGS. 1 and 2 with outer housing 70 included. Outer housing 70 is made of a similar material to internal housing 60. It is additionally configured to accommodate the previously discussed oil cooling system. Oil enters outer housing 70 through a port (not pictured) on the inner diameter of the rectifier, is directed within the assembly to remove heat from the diodes and resistors, and exits through oil port 72.

Figure 4:
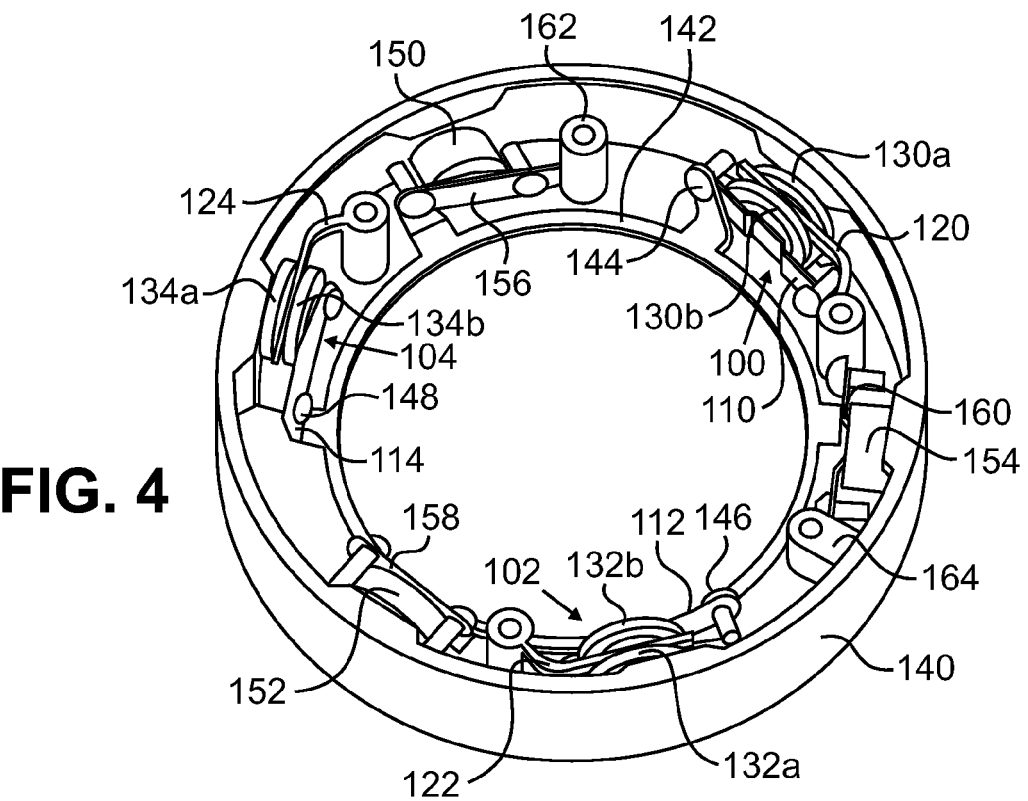
FIG. 4 is a perspective view of another embodiment of the present invention utilizing spring clips.

FIG. 4 is a perspective view of an alternate embodiment of the present invention where diode subassemblies 100, 102, and 104 are mounted with spring clips 110, 112, and 114. Each diode subassembly is assembled in the same way as the embodiment shown in FIGS. 1a and 1b. AC contacts 120, 122, and 124 are sandwiched between diodes 130a, 130b, 132a, 132b, 134a, and 134b. The cathodes of diodes 130a, 132a, and 134a are connected to DC− bus bar 140. The anodes of diodes 130a, 132a, 134a, and the cathodes of diodes 130b, 132b, 134b are connected to AC contacts 120, 122, and 124 respectively. The anode of diodes 130b, 132b, and 134b are connected to DC+ bus bar 142 via mounting screws 144, 146, and 148 of spring clips 110, 112, and 114. Resistors 150, 152, and 154 are held in place by spring clips 156, 158, and 160 in the same manner used to retain the diode subassemblies. Zener diodes, not pictured, are included with the resistors in some embodiments.

Contact to DC+ bus bar 142 is provided by DC+ contact 162. DC+ contact 162 may be connected to a spring clip, such as spring clip 156 for resistor 150 as pictured, or it may be connected directly to DC+ bus bar 142. Contact to DC− bus bar 140 is provided by DC− contact 164. DC− bus bar 140 also serves as the housing and a heat sink for the rotating rectifier. Therefore, DC− contact 164 can be connected to DC− bus bar 140 in any location where it would not interfere with other parts.

Figure 5:
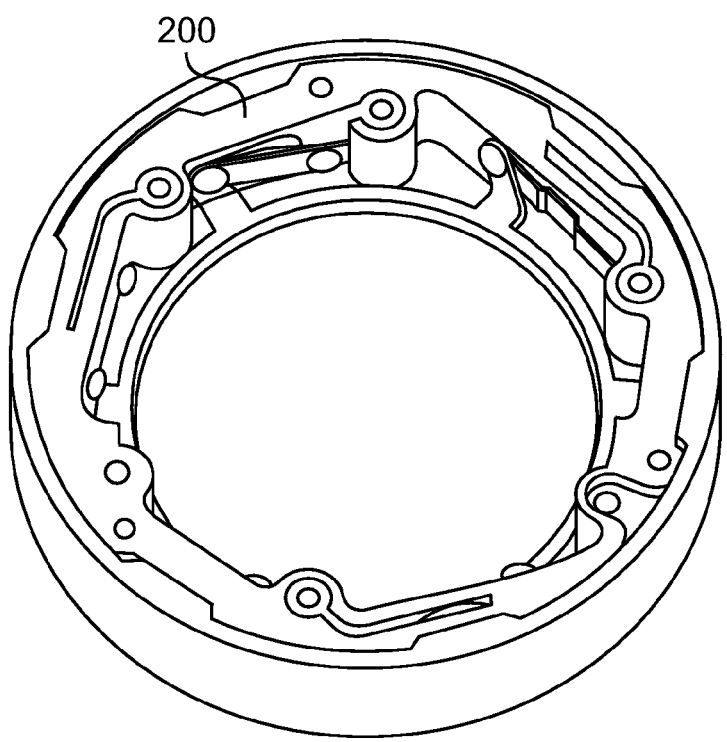
FIG. 5 is a perspective view of the embodiment shown in FIG. 4 with the internal housing installed.
Figure 6:
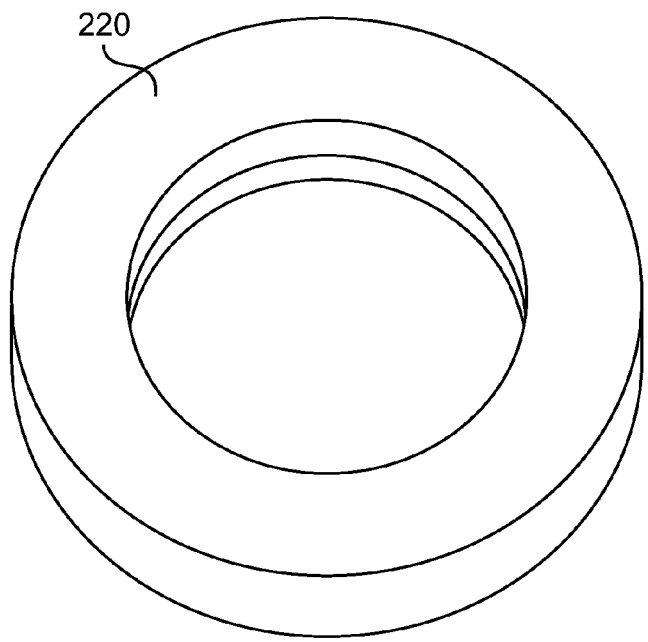
FIG. 6 is a perspective view of the embodiment shown in FIGS. 4 and 5 with the outer housing installed.

FIG. 5 is a perspective view of the rotating rectifier of FIG. 4 with internal housing 200 included. Internal housing 200 is made of a non-conducting material such as polyamide-imide (PAI). For example, one suitable PAI material is sold under the trademark TORLON® and manufactured by Solvay Advanced Polymers, LLC of Alpharetta, Ga. Internal housing 200 is used to position the components and add strength to the assembly. FIG. 6 is a perspective view of the rotating rectifier of FIGS. 4 and 5 with outer housing 220 included. Outer housing 220 is made of a similar material to internal housing 210.

Figure 7A:
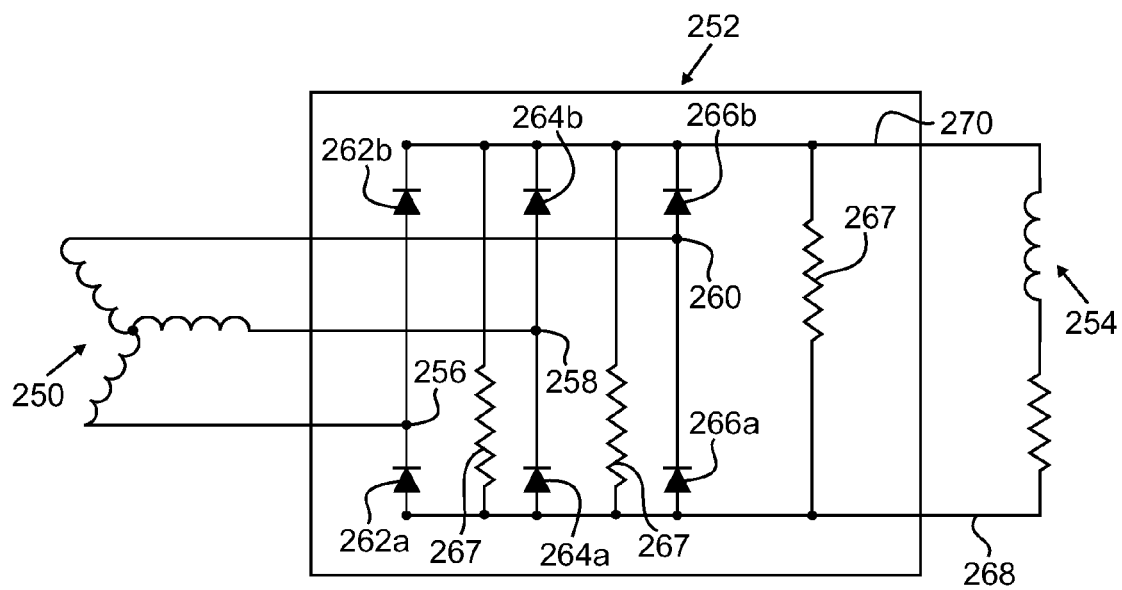
FIG. 7a is a schematic view of a three phase rectifier system.

FIG. 7a is a schematic view showing the parts of a rectifier assembly. The system has exciter rotor 250, rectifier assembly 252, and generator main field 254. Rectifier assembly 252 implements a full wave rectifier with diodes 262a, 262b, 264a, 264b, 266a, and 266b and resistor 267. AC connections 256, 258, and 260 make contact with the anodes of diodes 262a, 264a, and 264b and with the cathodes of 262b, 264b, and 266b. The cathodes of diodes 262a, 264a, and 266a are connected with DC− bus bar 268. The anodes of diodes 262b, 264b, and 268b are connected with DC+ bus bar 270. Resistor 267 is connected between DC− bus bar 268 and DC+ bus bar 270.

Figure 7B:
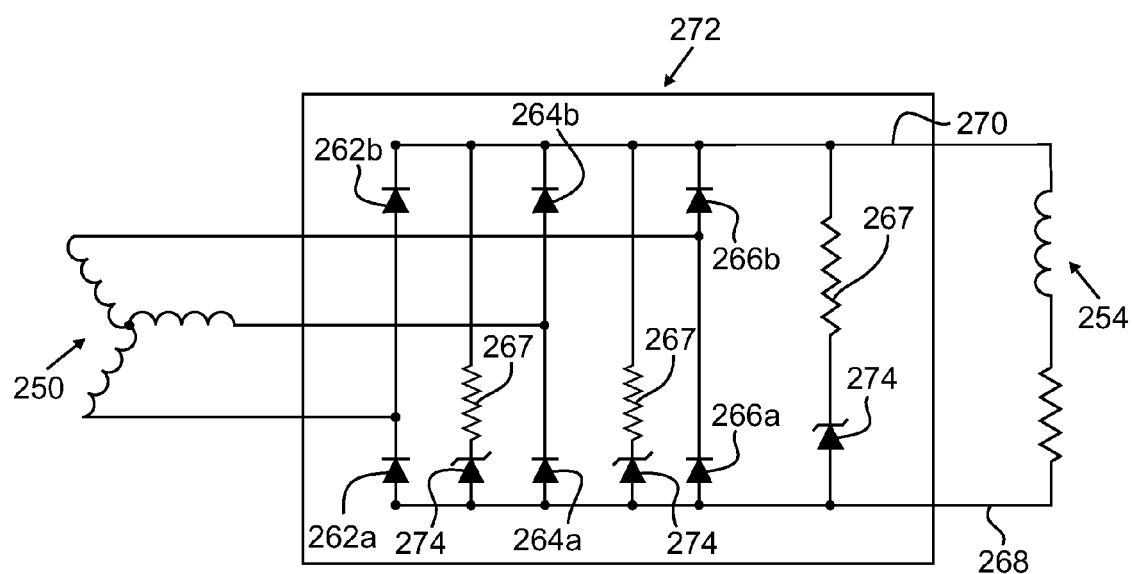
FIG. 7b is a schematic view of a three phase rectifier system where the rectifier assembly includes a zener diode.

FIG. 7b is a schematic view showing the parts of a rectifier assembly according to an alternate embodiment including a zener diode. The system has exciter rotor 250, rectifier assembly 272 and generator main field 254. Diodes 262a, 262b, 264a, 264b, 266a, and 266b are configured in the same way as described with respect to the embodiment of FIG. 7a to create a full wave rectifier. Resistor 267 is connected in series with zener diode 274 between DC− bus bar 268 and DC+ bus bar 270.

Many traditional rotating rectifiers experience semiconductor device failure due to inadequate cooling for high temperature applications. The radial diode subassembly construction of the present invention eliminates the need for solder mount parts which generally experience higher failure rates due to the heat and centrifugal forces encountered during normal operation. Another embodiment of the present invention provides for the use of distributed resistors to create a more even heat distribution. This reduces hot spots that are particularly prevalent during operation modes, such as starting, where oil cooling is not as effective. Additionally, series zener diodes are introduced in some embodiments to limit the reverse voltages that can occur during failure modes, reduce diode temperature, and increase diode life.

Although the embodiments shown utilize an inner DC+ bus bar and an outer DC− bus bar, the present invention also applies to the reverse orientation of an inner DC− bus bar and an outer DC+ bar. The present invention has been described with reference to preferred embodiments; workers skilled in the art will recognize that changes may be made in form and detail without departing from the spirit and scope of the invention.

The invention claimed is:
1. A rotating rectifier comprising:
   a circular inner DC bus;
   a circular outer DC bus;
   a first DC contact connected to the inner DC bus;
   a second DC contact connected to the outer DC bus;
   a plurality of diode subassemblies oriented radially between the inner and outer DC bus wherein each diode subassembly comprises an AC contact located between a first and second diode, the first diode is in contact with the inner DC bus and the second diode is in contact with the outer DC bus; and a plurality of resistors distributed evenly about the circumference of the rotating rectifier and connected between the inner DC bus and the outer DC bus, such that one resistor is located between every two circumferentially adjacent diode subassemblies.

2. The rotating rectifier of claim 1 wherein the diode subassemblies are secured by an interference fit between the inner DC bus and outer DC bus.

3. The rotating rectifier of claim 1 further comprising a plurality of spring clips adapted to secure the diode subassemblies to the outer DC bus.

4. The rotating rectifier of claim 1 wherein there are three diode subassemblies.

5. The rotating rectifier of claim 1 further comprising an inner non-conducting housing adapted to limit movement of the diode subassemblies.

6. The rotating rectifier of claim 5 wherein the inner non-conducting housing comprises polyamide-imide.

7. The rotating rectifier of claim 1 further comprising an outer non-conducting housing adapted to enclose the rotating rectifier.

8. The rotating rectifier of claim 7 wherein the outer non-conducting housing comprises polyamide-imide.

9. The rotating rectifier of claim 1 wherein the outer DC bus further comprises an external housing of the rotating rectifier.

10. The rotating rectifier of claim 9 further comprising a reinforcing strap surrounding the outer DC bus.

11. The rotating rectifier of claim 9 wherein the outer DC bus comprises beryllium copper.

12. The rotating rectifier of claim 1 wherein there are 3 resistors.

13. The rotating rectifier of claim 1 further comprising a plurality of zener diodes positioned adjacent to the resistors such that each resistor is connected in series with a zener diode between the inner DC bus and the outer DC bus.

14. A rotating rectifier comprising:
a first DC bus;
a second DC bus;
a first DC contact connected to the first DC bus;
a second DC contact connected to the second DC bus;
a first plurality of diodes in contact with the first DC bus;
a second plurality of diodes in contact with the second DC bus;
a plurality of AC contacts connected with the first and second plurality of diodes to form a full wave rectifier; and
a plurality of resistors connected between the first and second DC bus, said resistors being uniformly distributed about the circumference of the rotating rectifier such that one resistor is located between every two circumferentially adjacent AC contacts.

15. The rotating rectifier of claim 14 wherein the number of resistors and the number of AC contacts are equal.

16. The rotating rectifier of claim 14 wherein there are three resistors.

17. The rotating rectifier of claim 14 further comprising a plurality of zener diodes positioned adjacent to the resistors such that each resistor is connected in series with a zener diode between the first and second DC bus.

18. The rotating rectifier of claim 14 wherein the resistors are secured using an interference fit between the first and second DC bus.

19. A rotating rectifier comprising:
a circular inner DC bus;
a circular outer DC bus;
a first DC contact connected to the inner DC bus;
a second DC contact connected to the outer DC bus;
a plurality of diode subassemblies oriented radially between the inner and outer DC bus wherein each diode subassembly comprises an AC contact located between a first and second diode, the first diode is in contact with the inner DC bus and the second diode is in contact with the outer DC bus; and
three resistors distributed circumferentially about the rotating rectifier and connected between the inner DC bus and the outer DC bus.

* * * * *